March 21, 1967   C. W. BUCKLEY ETAL   3,310,139
DRIVE SYSTEM

Filed July 6, 1965   3 Sheets-Sheet 1

INVENTORS
CHARLES W. BUCKLEY
ERNST SCHREMPP
BY
Nicholas A. Pandiscio
ATTORNEY

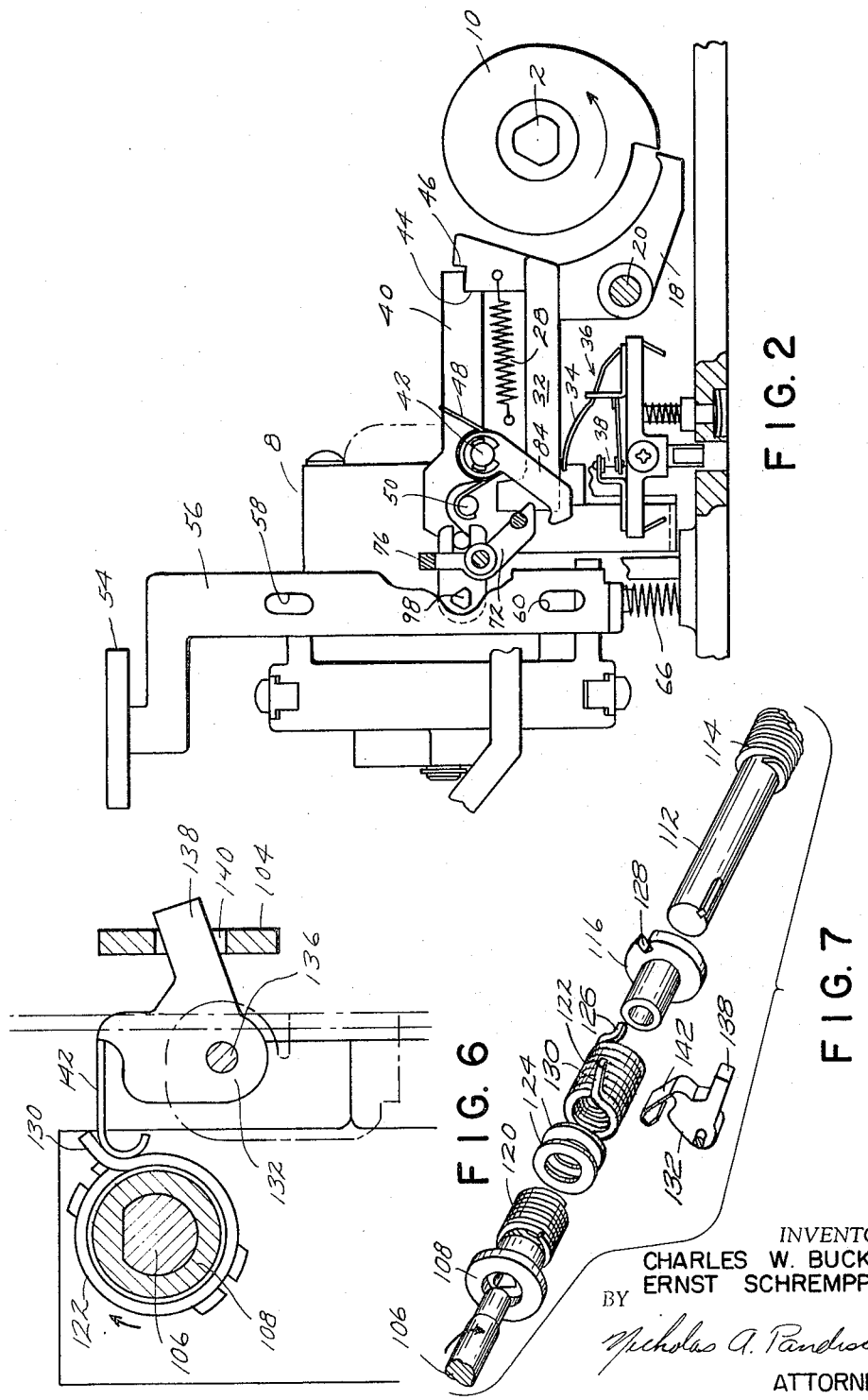

INVENTORS
CHARLES W. BUCKLEY
ERNST SCHREMPP
BY
*Nicholas A. Pandiscio*
ATTORNEY

United States Patent Office 3,310,139
Patented Mar. 21, 1967

3,310,139
DRIVE SYSTEM
Charles W. Buckley, Mount Vernon, N.Y., and Ernst Schrempp, Norwalk, Conn., assignors to Pitney-Bowes, Inc., Stamford, Conn., a corporation of Delaware
Filed July 6, 1965, Ser. No. 469,730
20 Claims. (Cl. 192—.02)

This invention relates to rotary drive systems and more particularly to a novel clutch drive system for a business machine that is subjected to repetitive operation.

In present day business machines the tend is to compactness with improved speed. This tendency is particularly acute in electric business machines intended for desktop use. Complicating the task of achieving high package density is the need for high level performance throughout a long lifetime of use with minimum repairs and replacement of parts. A particular difficulty in business machines is the reliability of stop-start drive mechanisms which are subject to activation at randomly occurring intervals and must operate through a predetermined machine cycle wherein several critical functions are performed with precise timing and motion by one or more mechanisms to which power is transmitted by the drive system. In the usual case the drive mechanism must be capable of (a) efficiently transmitting the torque capability of the prime mover, i.e. electric motor, and (b) handling a variable torque load without overloading the prime mover. These requirements are particularly stringent where for such reasons as space, weight, heat, or cost, it is necessary to minimize motor size.

Accordingly, one object of the invention is to provide a novel drive system for a business machine which is characterized by compactness and reliability of operation.

Another object of the invention is to provide a clutch drive system which is reliable, inexpensive to manufacture and assemble, and is designed to withstand extensive use over a long lifetime.

The illustrated embodiment is intended for a postage meter machine wherein various operations, e.g., printing and register actuation, are accomplished during a single machine cycle by various mechanisms operating off of a cam shaft. Accordingly, a more specific object of the invention is to provide a clutch drive mechanism for a cam shaft arranged to cause a plurality of mechanisms to operate at like or different times during a given machine cycle.

In the embodiment selected for illustration, the drive system not only operates a cam shaft provided with a plurality of cams but includes sequentially operated means for terminating power transmission on completion of a given machine cycle. Therefore, a further specific object of the invention is to provide a drive system which includes a novel clutch drive mechanism, a cam shaft driven by the clutch drive mechanism, and means for disabling the clutch driven upon completion of a predetermined cycle of operation.

Other objects and many of the attendant advantages of the invention will become more apparent as reference is had to the following detailed description of a preferred embodiment of the invention which is to be considered together with the accompanying drawings wherein:

FIG. 2 is a side elevational view in partial section of a portion of the mechanism for initiating and terminating operation of the drive system;

FIG. 6 is an enlarged fragmentary sectional view taken along line 6—6 of FIG. 1; and FIG. 7 is an exploded perspective view of the novel clutch drive mechanism embodying the invention.

Figure 1:
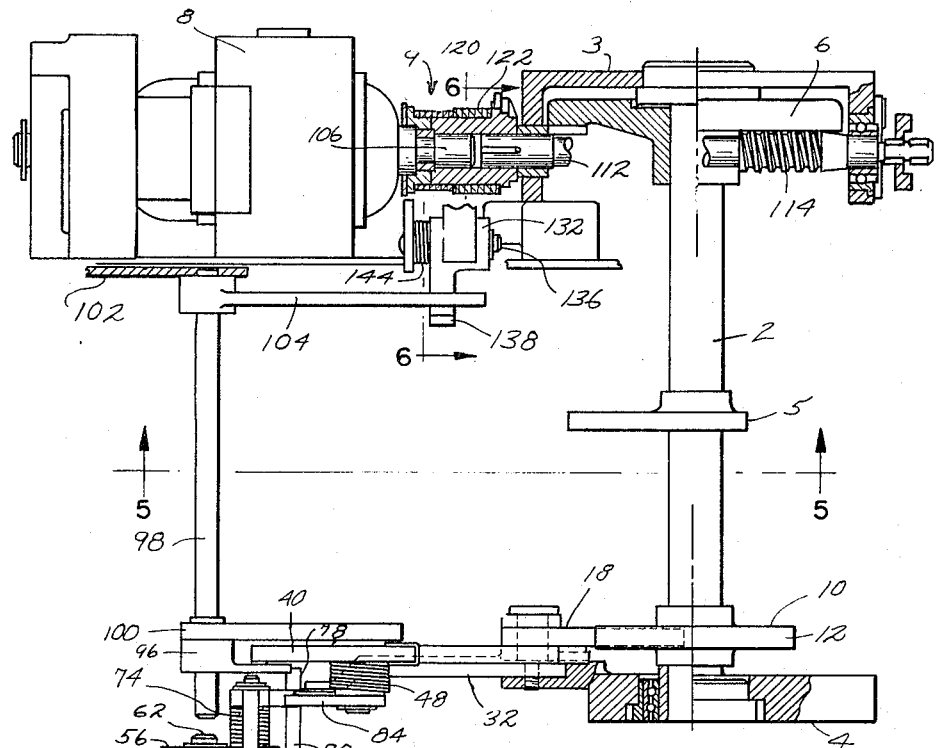
FIG. 1 is a plan view, partly in section, of the principal parts of a preferred embodiment of the invention.

It is to be appreciated that although the illustrated embodiment hereinafter described is a drive system for a postage meter type printing machine, the instant invention may be incorporated in various types of business machines where repetitive reliable operation is essential. Accordingly, operative mechanisms of the postage meter not essential to the invention are omitted from this disclosure, and, further in the interest of clarity and brevity, the drive system shown in the drawings is detailed only to the extent necessary to disclose the nature of the claimed invention. Unless otherwise indicated, the various parts are suitably arranged and mounted on the machine frame in a manner well understood in the art.

Described briefly, the illustrated embodiment comprises a cam shaft and a drive system designed to permit one revolution of the cam shaft for each cycle of operation of the postage machine. The drive system includes a motor whose operation is initiated by closing of a control switch, a clutch drive mechanism for driving the camshaft, and control means for (a) holding the switch closed long enough for the camshaft to make one full revolution under the influence of the clutch drive mechanism, and (b) disabling the clutch mechanism to prevent the camshaft from exceeding one full revolution.

Figure 3:
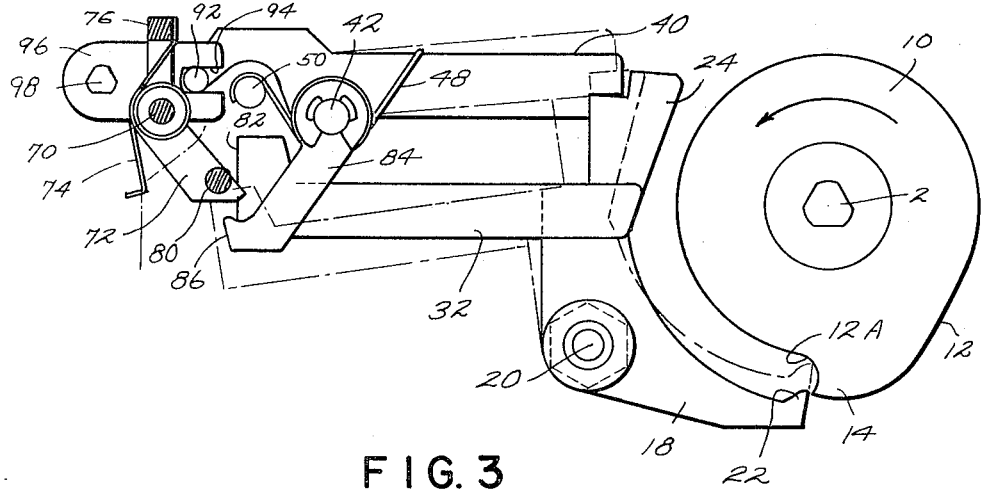
FIG. 3 is an enlarged fragmentary view showing the apparatus of FIG. 2 in a different operating position.
Figure 4:
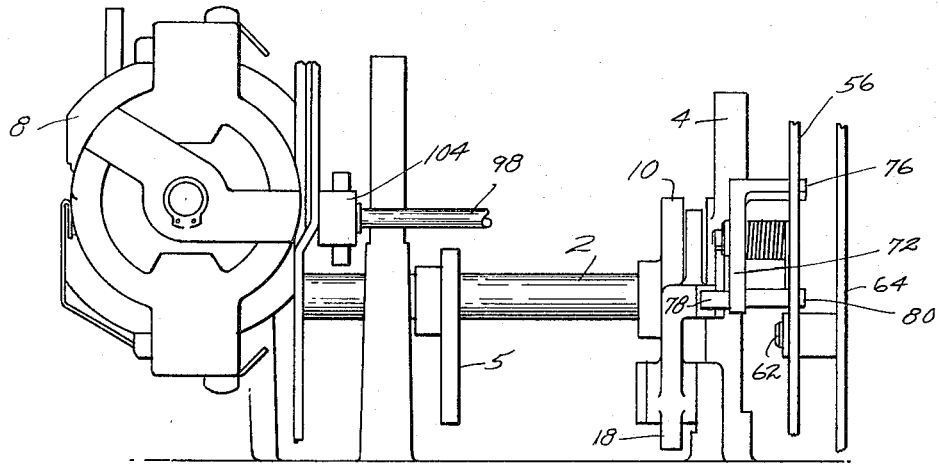
FIG. 4 is a front elevational view of the apparatus of FIG. 1.

Turning just to FIGS. 1, 2, and 3, the illustrated embodiment comprises a camshaft rotatably supported in two standards 3 and 4 and fitted with a plurality of rotary cams, e.g., cam 5, for operating associated mechanisms (not shown) such as a printing head or a mechanical register. By way of illustration but not limitation, the camshaft could drive a cam-operated printing apparatus of the kind shown and described in U.S. Patent 3,143,963, issued Aug. 11, 1964, to Ernst Schrempp for "Inking Control Means for Printing Devices." Affixed to one end of camshaft 2 is a worm gear 6 which enables it to be driven from an electric motor 8 acting through a novel clutch drive mechanism 9 described hereinafter. The other end of camshaft 2 is fitted with control cam 10 having an outer peripheral cam track 12 characterized by an abutment portion 14. Associated with control cam 10 is a cam follower unit comprising a cam follower arm 18 which is pivotally secured to standard 4 by a stud 20 and is provided at its free end with a follower nose 22 which engages the cam track. The follower arm also is formed with an upstanding detent finger 24. A tension spring 28 attached to finger 24 biases the follower arm counterclockwise so that its nose 22 is always urged toward the cam track. Fixed to cam follower arm 18 is a forwardly extending motor switch actuating and reset lever 32. The lower edge of switch lever 32 overlies the resilient control finger 34 of a conventional electrical motor control switch identified generally at 36. The switch is of the snap type wherein its switch contacts 38 open or close as the control finger 34 is displaced through an "over-center" position. The switch contacts are connected in series with motor 8.

The control cam 10, acting through follower 18 and lever 32, controls the timing of the opening and closing of switch 36 for each machine cycle. The cam follower arm is normally latched in the FIG. 2 position against the biasing action of spring 28 by means of a latch arm 40 which is pivotally mounted on a frame stud 42 and is notched so as to have a latching shoulder 44 which abuts against the cam follower arm. The latter is notched as at 46 to accommodate the notched end of the latch arm.

A spring 48, anchored at one end to a frame stud 50 and connected at the other end to the latch arm, biases the latch arm clockwise so as to keep it down in engagement with the detent finger of cam follower 18. The clutch arm is adapted to be manually operated by means of a cycle control key 54 which has a stem 56. The stem is provided with suitable slots 58 and 60 that cooperate with studs 62 on a vertical plate 64 respectively to support it for vertical control movements. Plate 64 is attached to the machine frame. The key stem is biased to a normal upper position by a compression spring 66.

Pivotally secured to an extension on the rear edge of key stem 56 by a stud 70 is a trip pawl 72 which is rotatably biased counterclockwise by a suitable coil spring 74 to a normal at-rest position determined by engagement of an offset shoulder 76 at the top end of the pawl with the rear edge of the key stem. The lower portion of the pawl has two laterally projecting studs 78 and 80. Stud 78 extends in front of (but does not engage) the front edge 82 of lever 32. Stud 80 extends in front of the rear edge of stem 56 and coacts with the stem to limit clockwise rotation of the pawl.

The lower end of the pawl normally overlies the upper edge of a forwardly and downwardly extending arm 84 formed integral with latch arm 40. The bottom end of arm 84 has a hook-like extension with a downwardly and rearwardly extending front edge surface 86. When the latch arm 40 is in latching position (FIG. 2), the bottom end of arm 84 is in position to be engaged by pawl 72 when key 54 is depressed.

The latch arm 40 also carries at its front end a laterally extending stud 92 that extends into a slot 94 formed in a rocker arm 96 that is secured to a rotatable shaft 98 which is appropriately journaled in two frame members 100 and 102. Stud 92 and slot 94 provide a pivotal connection between latch arm 40 rocker arm 96 such that rotational movement latch arm 40 in one direction causes shaft 98 to rotate in the opposite direction. Shaft 98 also carries a second rocker arm 104 whereby it is connected to the clutch drive mechanism described below. As more particularly explained hereinafter, clockwise movement of shaft 98 is required to disable the clutch drive mechanism.

Operation of the cam follower unit just described is as follows: When the key 54 is depressed, pawl 72 will engage arm 84 of latch 40, causing the latter to pivot counterclockwise to the position shown in broken lines in FIG. 3. When this occurs, spring 28 swings cam follower arm 18 counterclockwise to bring nose 22 into engagement with the inner operative portion 12A of the cam track. When this movement of latch arm 40 is effected, lever 32 will operatively displace switch arm 34 so that the contacts of switch 36 will close. This initiates operation of motor 8 to cause rotation of cam shaft 2 (counterclockwise as seen in FIG. 3). As the camshaft rotates, the cam follower 18 holds lever 32 in a position to keep switch 36 closed. However, just before the abutment portion of the cam reaches the nose 22, the cam track's increasing radius will displace the cam follower in a clockwise direction just enough to open switch 36. Further coasting of the cam shaft results in the cam follower rotating clockwise back beyond its original position just enough to permit latch spring 48 to reset latch arm 40 in detenting engagement with the cam follower. The camshaft coasts just enough for the abutment portion 14 of the cam to pass beyond nose 22 of the cam follower, thereby setting the stage for the next cycle of operation initiated by depression of key 54.

The arrangement of the pawl 72, the latch 40, and lever 32 is such that a repeat cycle of the machine will not occur even though the key 54 is held in the depressed condition. It will be here noted that the forward edge 82 of lever 32 is normally disposed just to the rear of stud 78 on the lower end of trip pawl 72. When the key has been depressed, the operative movement of lever 32 that occurs will cause its forward edge 82 to engage stud 78 and swing the pawl in a clockwise direction (as seen in FIGS. 2 and 3) so that the pawl is out of engagement with latch arm 84; this permits the latch 40 to be spring driven clockwise to a position engaging the top of the detent finger 24 of follower arm 18, so as to be in a ready condition to move back into detenting engagement with the cam follower when the latter is returned by cam 10 to its FIG. 2 position. Thus, relatching of the cam follower arm is independent of the length of time that key 54 is held down.

The clutch drive mechanism will now be described with reference to FIGS. 1, 5, 6, and 7. Turning first to FIGS. 1 and 7, the motor 8 includes an output shaft 106 on which is keyed a first driver drum 108. Journaled in the standard 3 which also acts as a bearing support for camshaft 2 is a wormshaft 112 having a worm 114 that meshes with and drives worm gear 6. Wormshaft 112 is in axial alignment with the motor output shaft 106 and is fitted with a second keyed drum 116, hereinafter called the "driven drum." It is to be noted that the adjacent ends of drums 108 and 116 are quite close but do not touch each other. Surrounding drum 108 and also overlapping onto drum 116 is a coil spring 120, hereinafter termed the "drive spring." The portions of the two drums that are surrounded by drive spring 120 have the same outer diameter. However, the drive spring is formed with an inside diameter smaller than the two drums. Accordingly, the drive spring must be expanded to fit over the drums, and its tendency to return to its original size causes it to exert a tight grip on the two drums. Of particular significance is the fact that, as seen from the position of motor 8, the friction drive spring is wound in the direction of rotation of the motor shaft 106. This is exactly opposite to the usual manner in which a coil-type friction drive spring is mounted and is unique in that rotation of the motor shaft tends to open, i.e., unwind the drive spring. However, the spring is sized such that its original grip on both drums is sufficiently great to transmit the full driving torque capability of the motor, i.e. locked rotor torque, to the camshaft. In this connection, it is to be observed also that the driver spring is not keyed to either drum and, hence, can slip relative to either or both drums if the load on the camshaft exceeds the driving capability of the motor. In other words, the friction drive spring can function as a slip clutch should an abnormal load be placed on the camshaft.

Figure 5:
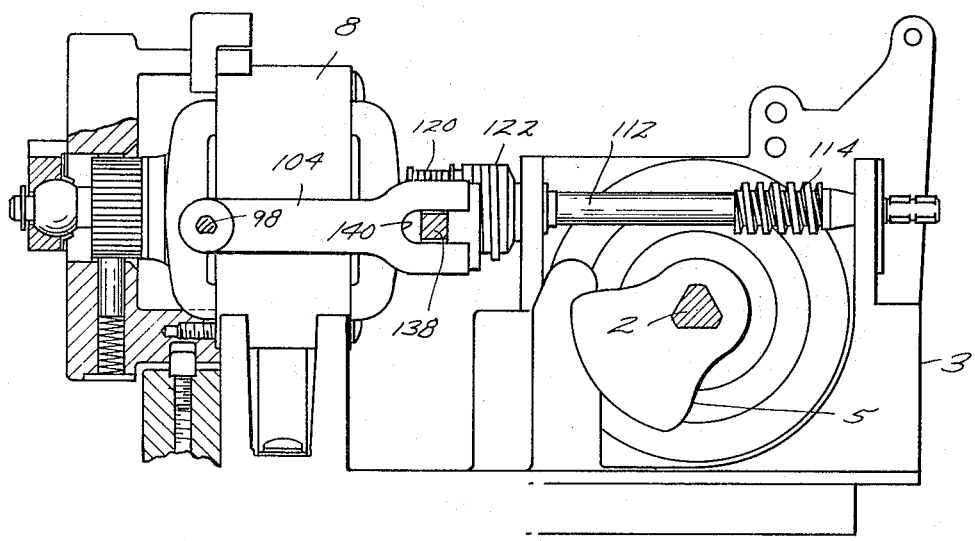
FIG. 5 is a sectional view in elevation taken along line 5—5 of FIG. 1.

The clutch drive mechanism connecting motor shaft 106 and worm shaft 112 also comprises a second coil spring 122 mounted on the second drum. Spring 122 is wound in the same direction as spring 120 and is formed with its inner diameter greater than the outer diameter of drum 116 so as to fit loosely thereon. A pair of spacers 124 are located between the two springs. One end of spring 122 is formed with a tail 126 that is held by a keyway 128 in drum 116. The other end of spring 122 is formed with a radially extending finger 130. Coil spring 122 functions as a shock absorber in effecting termination of rotation of the worm shaft, and, therefore, it is referred to hereinafter as the "shock absorber spring." Cooperating with the shock absorber spring is a stop pawl 132 which is pivotally mounted on a stud 136 attached to the machine frame. Stop pawl 132 is formed with a laterally extending arm 138 which extends into a slot 140 formed in the end of rocker arm 104. The stop pawl also includes a resilient finger 142 which extends toward the friction drive assembly a distance sufficient to intercept the radially extending finger 130 of the shock absorber spring when the stop pawl is in its extended at-rest position (FIG. 6). The pawl normally is held in its at-rest position by a suitable spring 144 mounted on stud 136. However, when shaft 98 is moved clockwise (as seen in FIG. 5) as a result of depression of key 54, the stop pawl is pivoted clockwise (as seen in FIG. 6) sufficient to withdraw it from the path of finger 130 of the shock absorber spring, thereby allowing the friction drive assembly to rotate freely. When shaft 98 rotates counterclockwise as occurs on relatching of cam follower 18, the stop pawl returns to its original at-rest position where its resilient finger will intercept finger 130. Since the motor has already been deenergized, interception of finger 130 causes the worm shaft to stop rotating resiliently, and also absorbs the kinetic energy of the motor shaft caused by the friction of the "drive spring."

In practice, fifty-to-one reduction is effected between worm gear 6 and worm 114, and for each cycle of operation of the drive system, the worm shaft rotates fifty revolutions while camshaft 2 undergoes one full revolution. The cycle of operation of the illustrated drive system using the aforesaid 50:1 ratio is straightforward. Depression of the trip key causes rocker arm 104 to move stop pawl 132 out of the way of the clutch drive assembly and causes closing of the contacts of switch 36. This starts the motor which in turn acts through the drive mechanism to drive the camshaft. The motor contacts remain closed for forty-nine revolutions of the worm shaft and then open to deenergize the motor. Immediately following opening of the switch contacts, the stop pawl 132 pivots to intercept the finger of the shock absorber spring. This interception causes a rapid deceleration of the worm shaft, bringing it to a final stop at the end of essentially the fiftieth revolution of the worm shaft. The kinetic energy of the worm shaft and its drum is absorbed by deflecting the shock absorber spring, the latter's normal loose fit on the drum enabling it to undergo a winding action during which the worm shaft rotates a small angular amount past home position. The shock absorber spring then gives up its energy to drive the worm shaft back to home position. When the shock absorber spring is intercepted by the stop pawl, it not only stops the worm shaft but also absorbs the slip torque of the friction drive spring. The motor is coasting, deenergized, at this time and is decelerated to a stop by virtue of the friction slip torque. In practice, the motor shaft will make several more revolutions after the worm shaft stops before it comes to rest, with its kinetic energy having been absorbed by both the driver and shock absorber springs. The foregoing mode of operation assures that cam 10 will always stop in virtually the same position, with the cam follower 18 relatched so that the contacts of switch 36 will not reclose until the key 54 is depressed again.

The foregoing drive system offers many advantages. It provides instantaneous coupling and decoupling between the motor and the camshaft with minimum shock to the system due to the energy which must be absorbed when a rapidly rotating member engages a stationary member or when a rapidly rotating member is brought to a quick stop. It also is compact, relatively inexpensive, reliable, and adapted to many applications in addition to postage metering machines. Thus, for example, the invention is applicable to desk calculators, vending machines, etc., where repetitive cyclic operation is initiated at random intervals. Still another advantage is that the invention is susceptible of many vibrations obvious to persons skilled in the art. Therefore, it is intended that the illustrated embodiment be considered as merely exemplary and that the invention not be limited except as warranted by the following claims.

We claim:

1. A drive system comprising a first shaft, means for driving said first shaft in a given direction, a second shaft, means adapted to be driven by said second shaft, and drive means for driving said second shaft from said first shaft, said drive means comprising a driver drum affixed to said first shaft, a driven drum affixed to said second shaft, a friction drive spring coiled about and gripping said drums with sufficient force to transmit the maximum driving torque of said first shaft to said second shaft, a shock absorber spring coiled about said second drum, said shock absorber spring having one end attached to said second drum and a finger at its other end extending outwardly of said driven drum, and means for intercepting said finger to effect stopping of said second shaft.

2. A driving system as defined by claim 1 wherein said shock absorber spring is keyed to said driven drum.

3. A driving system as defined by claim 1 further including means for actuating said finger intercepting means in response to the means driven by said second shaft.

4. A drive system as defined by claim 1 wherein said friction drive spring is wound so that it tends to uncoil as said driver drum rotates, and further wherein said shock absorber spring is wound in the same direction as said friction drive spring.

5. In a postage metering machine a drive system comprising a first shaft, motor means for driving said shaft in a given direction, a driver drum on said first shaft, a second shaft, a driven drum on said second shaft, a camshaft, means for rotating said camshaft from said second shaft, a friction drive spring coiled about and gripping said drums with sufficient force to transmit the maximum driving torque capability of said motor means to said second shaft, said friction drive spring coiled so that it tends to unwind with rotation of said first shaft and will slip relative to at least one of said drums when the second shaft is subjected to a decelerating force greater than the torque of said first shaft.

6. The combination of claim 5 further including a shock absorber coil spring on said driven drum, said shock absorber spring having one portion secured to said driven drum and a second finger portion projecting laterally thereof, and stop means for intercepting said finger portion as said driven drum is rotating, whereby to effect quick stopping of said second shaft.

7. The combination of claim 6 further including means for actuating said stop means at a predetermined point in the cycle of rotation of said camshaft.

8. The combination of claim 6 further including means for actuating said stop means and means for deenergizing said motor means prior to interception of said finger portion by said stop means.

9. The combination of claim 6 wherein said shock absorber spring is wound in the same direction as said friction drive spring.

10. The combination of claim 5 further including selectively operated means for energizing said motor means.

11. A drive system comprising a first shaft, motor means operative when energized to rotate said shaft, a second shaft, and clutch drive means for driving said second shaft from said first shaft, said clutch drive means comprising a coil spring connecting said first and second shafts, said coil spring disposed so that it tends to uncoil in response to rotation of said first shaft but is capable of imparting the full torque of said first shaft to said second shaft, means for energizing said motor means, and means for stopping rotation of said second shaft upon deenergization of said motor means.

12. A clutch drive assembly comprising first and second rotatable members having cylindrical outer surfaces of comparable diameters, said rotatable members disposed in coaxial end-to-end relation, a first coil spring formed with an inside diameter smaller than the diameters of said outer surfaces, said first coil spring surrounding and frictionally gripping the outer surfaces of both said rotatable members so that rotation of one member results in rotation of the other member, a second coil spring formed with an inside diameter larger than the diameters of said outer surfaces, said second coil spring mounted on said other rotatable member, means locking one end of said second coil spring to said other rotatable member, and means at the other end of said second coil spring whereby said second coil spring can be held to stop rotation of said other member by said one member.

13. A clutch drive assembly as defined by claim 12 wherein said rotatable members are hollow and are adapted to be secured to rotatable shafts.

14. A clutch drive assembly as defined by claim 12 wherein said other rotatable member has an exterior slot and said one end of said second coil spring is disposed in said slot.

15. A clutch drive assembly as defined by claim 12 wherein said first and second coil springs are wound in the same direction.

16. A drive system comprising an electric motor having a first output shaft, a first drum connected for rotation with said first shaft, a second shaft connected for rotation with said second drum, a camshaft connected for rotation by said second shaft, and a coil spring connecting said drums so that rotation of said first shaft results in rotation of said second shaft and said camshaft, said coil spring arranged so as to transmit the full torque capability of said first shaft to said second drum and to slip relative to said second drum when the resistance to rotation of said camshaft exceeds the torque output of said first shaft.

17. A drive system as defined by claim 16 further including selectively operable means for energizing said motor, means for deenergizing said motor when said camshaft has rotated through a selected angle, and means for mechanically stopping rotation of said camshaft and absorbing the kinetic energy of said first shaft after said motor has been deenergized.

18. A drive system comprising a first rotatable shaft, means for unidirectionally rotating said first shaft, a second rotatable shaft, slip clutch means connecting said first and second shafts so as to transmit the full torque capability of said first shaft to said second shaft, and a shock absorber coil spring surrounding a portion of said second shaft, said shock absorber spring having one end locked to said second shaft and means at its other end whereby it can be held to stop rotation of said second shaft.

19. A drive system comprising a first rotatable member; electrically operated drive means for rotating said first member in a given direction; a second rotatable member; means adapted to be driven by said second rotatable member; mechanical drive means for rotating said second member with said first member, said mechanical drive means comprising a friction drive spring coiled about and interconnecting adjacent end portions of said first and second members, said friction drive spring wound so that it tends to uncoil as said first member rotates in said given direction, said friction drive spring gripping said first and second members with sufficient force to transmit the maximum driving torque of said first member to said second member; a shock absorber spring coiled about said second member, said shock absorber spring having one end attached to said second member and a finger at its other end extending outwardly of said second member; and means for intercepting said finger to effect stopping of said second member.

20. A drive system as defined by claim 19 wherein said shock absorber spring is wound in the same direction as said friction drive spring.

References Cited by the Examiner

UNITED STATES PATENTS

| | | | |
|---|---|---|---|
| 677,872 | 7/1901 | Locke | 64—30 X |
| 2,242,379 | 5/1941 | Wahl | 64—30 |
| 2,535,490 | 12/1950 | Emrick | 192—2 |
| 2,735,029 | 2/1956 | Dyer et al. | 192—2 X |
| 2,976,976 | 3/1961 | Parker | 192—81 X |

DAVID J. WILLIAMOWSKY, *Primary Examiner.*

ARTHUR T. McKEON, *Examiner.*